United States Patent [19]
Gill

[11] Patent Number: 5,825,595
[45] Date of Patent: Oct. 20, 1998

[54] SPIN VALVE SENSOR WITH TWO SPUN VALUES SEPARATED BY AN INSULATED CURRENT CONDUCTOR

[75] Inventor: Hardayal Singh Gill, Portola Valley, Calif.

[73] Assignee: International Business Machines Corporation, Armonk, N.Y.

[21] Appl. No.: 855,255

[22] Filed: May 13, 1997

[51] Int. Cl.$^6$ ..................................................... G11B 5/39
[52] U.S. Cl. ............................................................ 360/113
[58] Field of Search ............................................ 360/113

[56] References Cited

U.S. PATENT DOCUMENTS

| | | | |
|---|---|---|---|
| 4,103,315 | 7/1978 | Hempstead et al. | 360/113 |
| 4,809,109 | 2/1989 | Howard et al. | 360/113 |
| 5,027,243 | 6/1991 | Gill et al. | 360/113 |
| 5,159,513 | 10/1992 | Dieny et al. | 360/113 |
| 5,193,038 | 3/1993 | Smith | 360/113 |
| 5,206,590 | 4/1993 | Dieny et al. | 360/113 |
| 5,262,914 | 11/1993 | Chen et al. | 360/113 |
| 5,264,980 | 11/1993 | Mowry et al. | 360/113 |
| 5,287,238 | 2/1994 | Baumgart et al. | 360/113 |
| 5,301,079 | 4/1994 | Cain et al. | 360/113 |
| 5,341,261 | 8/1994 | Dieny et al. | 360/113 |
| 5,471,358 | 11/1995 | Tadokoro et al. | 360/113 |
| 5,508,866 | 4/1996 | Gill et al. | 360/113 |
| 5,528,440 | 6/1996 | Fontana et al. | 360/113 |
| 5,557,491 | 9/1996 | Gill et al. | 360/113 |
| 5,561,368 | 10/1996 | Dovek et al. | 360/113 |
| 5,576,915 | 11/1996 | Akiyama et al. | 360/113 |
| 5,627,703 | 5/1997 | Smith | 360/113 |
| 5,701,222 | 12/1997 | Gill et al. | 360/113 |

FOREIGN PATENT DOCUMENTS

| | | |
|---|---|---|
| 0628835A2 | 12/1994 | European Pat. Off. . |
| 0676746A1 | 10/1995 | European Pat. Off. . |
| 4-358310 | 12/1992 | Japan . |
| 6-060336 | 3/1994 | Japan . |
| 6-150259 | 5/1994 | Japan . |
| WO96/38740 | 12/1996 | WIPO . |

OTHER PUBLICATIONS

U.S. Patent Application No. 08/606,625, "System for Resetting Sensor Magnetization in a Spin Valve Magnetoresistive Sensor", filed Feb. 26, 1996, Speriosu et al.

*IBM Technical Disclosure Bulletin,* vol. 30, No. 8, pp. 461–464 Jan. 1988, "Close Proximity Coupled Differential Magneto–Resistive Read Head Structure", A. W. Vinal.

(List continued on next page.)

*Primary Examiner*—Craig A. Renner
*Attorney, Agent, or Firm*—Gray Cary Ware Freidenrich

[57] ABSTRACT

A read sensor includes first and second substantially planar magnetoresistive spin valves, parallel to each other. Each spin valve includes a pair of ferromagnetic layers. Between the spin valves lies a bias conductor, separated from each spin valve by respective insulating layers. In each spin valve, the outer ferromagnetic layer is a current-induced ferromagnetic pinned layer whose magnetization direction is pinned by a pinning field supplied by a bias current flowing in the bias conductor. Sense currents are directed through the spin valves in a direction substantially perpendicular to the magnetization directions of the current-induced ferromagnetic pinned layers. The magnetization orientations of the ferromagnetic layers are established by a combined field provided by the sense and bias currents. When the read sensor detects an external magnetic field, each spin valve exhibits a voltage drop. With external magnetic fields occurring in a predetermined range, one spin valve's voltage drop is directly proportional to the magnetic flux transitions, and the other is inversely proportional to the magnetic flux transitions. Thus, if the spin valves' output signals are subtracted, the desired signal is amplified while common mode noise is canceled out. Advantageously, no antiferromagnetic layers are needed to pin the magnetization directions of the current-induced ferromagnetic pinned layers. Thus, problems with antiferromagnetic layers, such as blocking temperatures, are avoided.

30 Claims, 5 Drawing Sheets

OTHER PUBLICATIONS

*J. Appl. Phys.,* vol. 76, No. 9, Nov. 1, 1994, "Distribution of Blocking Temperature in Bilayered $Ni_{81}Fe_{19}/NiO$ Films", S. Soeya et al., pp. 5356–5360.

*J. Appl. Phys.,* vol. 79, No. 8, Apr. 15, 1996, "Exchange Coupling of Sputter Deposited NiCo–O/NiFe Thin Films", M. Tan et al., pp. 5012–5014.

IEEE *Transactions on Magnetics,* vol. 32, No. 1, Jan. 1996, "Spin–Valve Heads Utilizing Antiferromagnetic NiO Layers", Y. Hamakawa et al., pp. 149–155.

*Appl. Phys. Lett.,* Dec. 2, 1996, "NiMn–pinned Spin Valves with High Pinning Field Made by Ion Beam Sputtering", S. Mao et al., pp. 3593–3595.

*Journal of Magnetism and Magnetic Materials,* 1994, "Giant Magnetoresistance in Spin–Valve Multilayers", B. Dieny, pp. 335–359.

IEEE *Transations on Magnetics,* vol. 28, No. 5. Sep. 1992, "Giant Magnetoresistance: A Primer", R. L. White, pp. 2481–2487.

SPIN VALVE SENSOR WITH TWO SPUN VALUES SEPARATED BY AN INSULATED CURRENT CONDUCTOR

BACKGROUND OF THE INVENTION

1. Field of the Invention

The present invention relates to sensors for reading magnetic flux transitions from magnetic media such as disks and tape. More particularly, the invention concerns a read sensor employing two spin valves with an intermediate bias conductor to achieve differential detection, significantly boosting signal-to-noise ratio.

2. Description of the Related Art

A magnetoresistive ("MR") sensor detects magnetic field signals by measuring changes in the resistance of an MR element, fabricated of a magnetic material. Resistance of the MR element changes as a function of the strength and direction of magnetic flux being sensed by the element. Conventional MR sensors operate on the basis of the anisotropic magnetoresistive ("AMR") effect, in which a component of the element's resistance varies as the square of the cosine of the angle between the magnetization in the element and the direction of sense or bias current flow through the element.

MR sensors are useful in magnetic recording systems where recorded data is read from a magnetic medium. In particular, the external magnetic field from the recorded magnetic medium (the signal field) causes a change in the direction of the magnetization of an MR head. This in turn causes a change in electrical resistance in the MR read head and a corresponding change in the sensed current or voltage.

A variety of magnetic multilayered structures demonstrate a significantly higher MR coefficient than an AMR sensor. This effect is known as the as the giant magnetoresistive ("GMR") effect. The essential features of these structures include at least two ferromagnetic metal layers separated by a nonferromagnetic metal layer. This GMR effect has been found in a variety of systems, such as iron-chromium (FeCr) and cobalt-copper (CoCu) multilayers exhibiting strong antiferromagnetic coupling of the ferromagnetic layers. The GMR effect is also found in essentially uncoupled layered structures in which the magnetization orientation in one of the two ferromagnetic layers is fixed or pinned. The physical origin is the same in all types of GMR structures: the application of an external magnetic field causes a variation in the relative orientation of the magnetizations of neighboring ferromagnetic layers. This in turn cases a change in the spin-dependent scattering of conduction electrons and thus the electrical resistance of the structure. The resistance of the structure thus changes as the relative alignment of the magnetizations of the ferromagnetic layers changes.

One specific application of GMR is the spin valve sensor. Spin valve sensors include a nonmagnetic conductive layer called a "spacer" layer, sandwiched between "pinned" and "free" ferromagnetic layers. The magnetization of the pinned layer is pinned 90° to the quiescent magnetization of the free layer. Unlike the pinned layer, the free layer has a magnetic moment that freely responds to external magnetic fields, including those from a magnetic disk.

A spin valve sensor may be used to read data by directing a sense current through the free, spacer, and pinned layers of the sensor. The resistance of the spin valve sensor changes in proportion to rotation of the magnetic free layer (which moves freely) relative to the pinned layer (which is fixed in place). Such changes in resistance are detected and ultimately processed as playback signals.

In a typical spin valve MR sensor, the free and pinned layers have equal thicknesses, but the spacer layer is one half as thick as either of the free or pinned layers. An exemplary thickness of each of the free and pinned layers is 50 Å and an exemplary thickness of the spacer layer is 25 Å.

As mentioned above, the magnetization of the pinned layer is pinned 90° to the magnetization of the free layer. Pinning may be achieved by depositing the ferromagnetic layer to be pinned onto an antiferromagnetic layer to create an interfacial exchange coupling between the two layers. The antiferromagnetic layer may be constructed from a group of materials which include FeMn, NiMn, and NiO.

The spin structure of the antiferromagnetic layer can be aligned along a desired direction (in the plane of the layer) by heating beyond the "blocking" temperature of the antiferromagnetic layer and cooling in the presence of a magnetic field. The blocking temperature is the temperature at which the magnetic spins within a material lose their orientation. In other words, a material's blocking temperature is reached when exchange an isotropy vanishes because the local an isotropy of the antiferromagnetic layer, which decreases with temperature, has become too small to anchor the antiferromagnetic spins to the crystallographic lattice. The blocking temperatures of many antiferromagnetic materials ranges from about 160° to 200° C. Thus, when the blocking temperature of the antiferromagnetic material is exceeded, the spins of the antiferromagnetic layer lose their orientation causing the first ferromagnetic layer to no longer be pinned.

Unlike the pinned layer, the free layer has a magnetic moment that freely responds to external magnetic fields, including those from a magnetic disk. The thickness of the spacer layer is chosen to be less than the mean free path of conduction electrons through the sensor. With this arrangement, a portion of the conduction electrons are scattered by the interfaces of the spacer layer with the pinned and free layers. When the magnetizations of the pinned and free layers are parallel with respect to one another, scattering is minimal; when the magnetizations of the pinned and free layers are antiparallel, scattering is maximized. Due to changes in scattering, the resistance of the spin valve sensor changes in proportion to the cosine of the angle between the magnetizations of the pinned and free layers.

A number of U.S. patents disclose spin valve sensors. One patent, for example, shows a spin valve sensor in which at least one of the ferromagnetic layers is Co an alloy thereof, where the magnetizations of the two ferromagnetic layers are maintained substantially perpendicular to each other at zero externally applied magnetic field by exchange coupling of the pinned ferromagnetic layer to an antiferromagnetic layer. See, e.g., U.S. Pat. No. 5,159,513, assigned to International Business Machines Corp. Another patent discloses a basic spin valve sensor where the free layer is a continuous film having a central active region and end regions. The end regions of the free layer are exchange biased by exchange coupling to one type of antiferromagnetic material, and the pinned layer by exchange coupling to a different type of antiferromagnetic material. See, e.g., U.S. Pat. No. 5,206,590.

A read head employing a spin valve sensor, called a "spin valve read head", may be combined with an inductive write head to form a "combined" head. The combined head may have the structure of either a merged head, or a piggyback head. In a merged head a single layer serves as a shield for the read head and as a first pole piece for the write head. A piggyback head has a separate layer which serves as the first pole piece for the write head. In a magnetic disk drive an air bearing surface ("ABS") of a combined head is supported adjacent a rotating disk to write information on or read information from the disk. Information is written to the rotating disk by magnetic fields which fringe across a gap between the first and second pole pieces of the write head.

To read data, a sense current is directed through the free, spacer, and pinned layers of the sensor. The resistance of the spin valve sensor changes in proportion to relative rotation of the magnetic moments of the free and pinned layers. Such changes in resistance are detected and ultimately processed as playback signals.

Known spin valve sensors provide a number of benefits, most notably their significantly higher MR coefficient in comparison to AMR sensors. These sensors may fully satisfy the needs of many different applications. Occasionally, however, spin valve sensors may output a signal with various types of distortion, yielding inaccurate data.

As an example, one source of distortion produced by a spin valve sensor is field noise. Another source of distortion, called "thermal asperity", arises from contact between a read/write head and a nearby disk. This contact may occur as the result of a high shock event, where G-forces momentarily bounce the head against the disk surface. Head-disk contact may also occur, for instance, when the head contacts a raised irregularity in the disk surface, such as a defect in the material of the disk surface or a contaminant such as a particle of dust, debris, etc. Such contact heats the head, including the spin valve sensor, increasing the sensor's resistance and thereby distorting the sensor's output signal.

Thus, known spin valve sensors may occasionally output signals with various types of distortion, thereby producing inaccurate readback signals.

SUMMARY OF THE INVENTION

Broadly, the present invention concerns a read sensor employing two spin valves with an intermediate bias conductor to achieve differential detection, significantly the sensor's boosting signal-to-noise ratio. Advantageously, the read sensor of the invention does not use an antiferromagnetic layer to pin ferromagnetic layers of the spin valves. Instead, a combined field is provided by sense currents and a bias current flowing through the sensor. As a result of this combined pinning field, the two spin valves respond differently to sensed external magnetic fields. By combining output signals from the two spin valves, the desired signals is doubled, while common mode noise is subtracted out.

The sensor of the invention includes first and second substantially planar magnetoresistive spin valves, parallel to each other. Each spin valve includes two ferromagnetic free layers separated by a conductive spacer. Between the spin valves lies a bias conductor, separated from each spin valve by respective insulating layers.

The sensors are operated by directing sense currents through the spin valves in a direction substantially perpendicular to the easy axes of the ferromagnetic layers. A bias current is directed through the bias conductor in a direction substantially parallel to the easy axes of the ferromagnetic layers. The sense and bias currents have the effect of pinning the magnetization directions of the outer ferromagnetic free layers in specific predetermined directions. Accordingly, these free layers are also referred to as "current-induced ferromagnetic pinned layers." When the read sensor is placed near an external magnetic field such as the field from magnetic flux transitions stored on a magnetic data storage medium, each spin valve exhibits a voltage drop. When the sensed external magnetic field occurs in a predetermined range including zero, one sensor's voltage drop is directly proportional to the magnetic flux transitions, and the other is inversely proportional to the magnetic flux transitions. Therefore, taking the difference of the spin valves' signals provides an output signal with reduced noise, since common mode noise is canceled out.

In view of the foregoing, it is apparent that the invention has a number of different aspects. According to an apparatus aspect, the invention may be implemented to provide a novel read sensor or a magnetic storage system including such a read sensor. Additionally, the invention may be implemented to provide a method to operate a novel read sensor.

The invention affords its users with a number of distinct advantages. Chiefly, the invention provides a spin valve sensor exhibiting a significantly reduced distortion from electric fields, thermal asperities, and other common mode noises. The invention also provides a number of other benefits, as shown below.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections
Spin Valve Sensor—Materials

Figure 1:
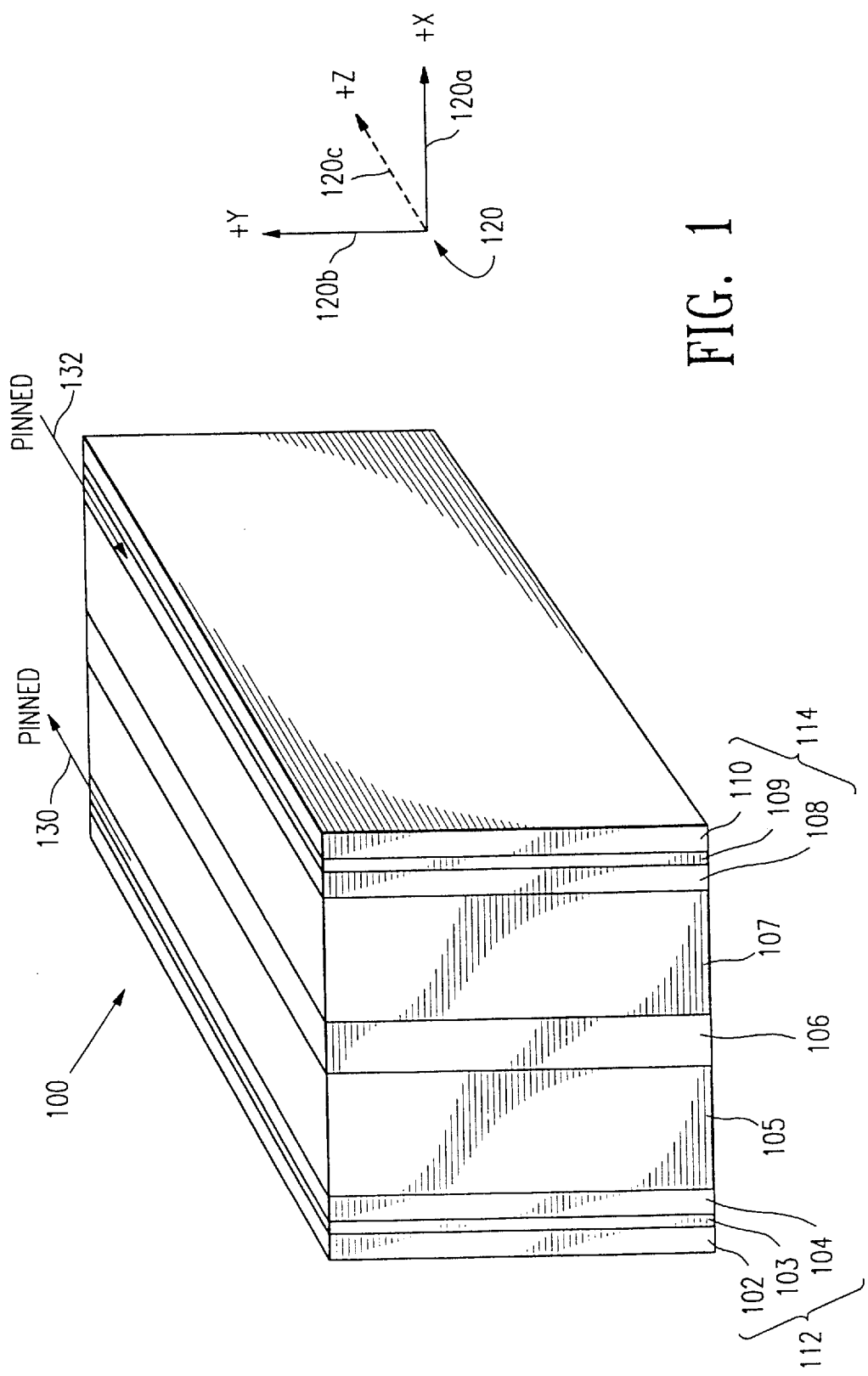
FIG. 1 is a cross-sectional perspective view of a dual spin valve read sensor according to the invention.

One aspect of the invention concerns a read sensor employing two spin valves with an intermediate bias conductor to achieve differential detection. FIG. 1 shows the hardware components and interrelationships of an exemplary embodiment of this sensor. In particular, a sensor 100 includes a number of substantially parallel layers. The sensor 100 is preferably built upon a substrate (not shown) proximate an air bearing surface (not shown) thereof. The substrate and sensor 100 are preferably part of a slider (not shown) used in a magnetic data storage and retrieval system, as discussed in greater detail below. During operation of the sensor 100, the air bearing surface glides above a magnetic data storage medium, separated from the medium by a thin cushion of air. In view of the substantial amount of known information concerning the arrangement of magnetoresistive and spin valve sensors in sliders, the precise location of the sensor 100 within a slider is readily ascertainable by an ordinarily skilled artisan having the benefit of this disclosure, without undue experimentation.

The sensor 100 includes a pair of spin valves 112, 114. The spin valve 112 includes a first ferromagnetic free layer 102, a conductive spacer layer 103 in contact with the layer 102, and a second ferromagnetic free layer 104 in contact with the layer 103. The first and second ferromagnetic layers 102/104 comprise ferromagnetic materials of suitable type and thickness for application in spin valves. As an example, the layers 102/104 may comprise about 30–100 Å of NiFe. The conductive spacer layer 103 comprises a conductive material of suitable type and thickness for application in spin valves. As an example, the layer 103 may comprise about 20–30 Å of Cu.

The second spin valve 114 also includes a first ferromagnetic free layer 108, a conductive spacer layer 109 in contact with the layer 108, and a second ferromagnetic free layer 110 in contact with the layer 109. The composition and thicknesses of the layers 108–110 may be similar to the layers 102–104. The layers 102/104 and 108/110 are referred to as ferromagnetic "free" layers because their magnetization directions are not pinned by any corresponding antiferromagnetic materials, and they are therefore free to move in response to external magnetic fields. Nonetheless, for reasons explained below, the layers 102/110 are referred to as "current-induced ferromagnetic pinned layers.

In the illustrated embodiment, the spin valves 112/114 are separated by a tri-layer structure including a bias conductor 106 sandwiched between contacting insulating layers 105/107. The bias conductor 106 comprises a conductive material such as Ta, having a thickness of about 500 Å. Each insulating layer 105, 107 comprises an insulator such as $Al_2O_3$ or another suitable insulator having a thickness of about 500 Å. The thickness of the layers 105–107 is preferably about 0.15–0.2 microns, although this value may change significantly depending upon the particular manner of implementing the sensor 100.

Furthermore, ordinarily skilled artisans, having the benefit of this disclosure, will recognize that aspects such as the materials and thicknesses of the various components of the sensor 100 may be varied from the specific foregoing description in a number of different ways without departing from the scope of the present invention.

Spin Valve Sensor—Sense Current, Biasing Current and Output Measurement

Figure 2:
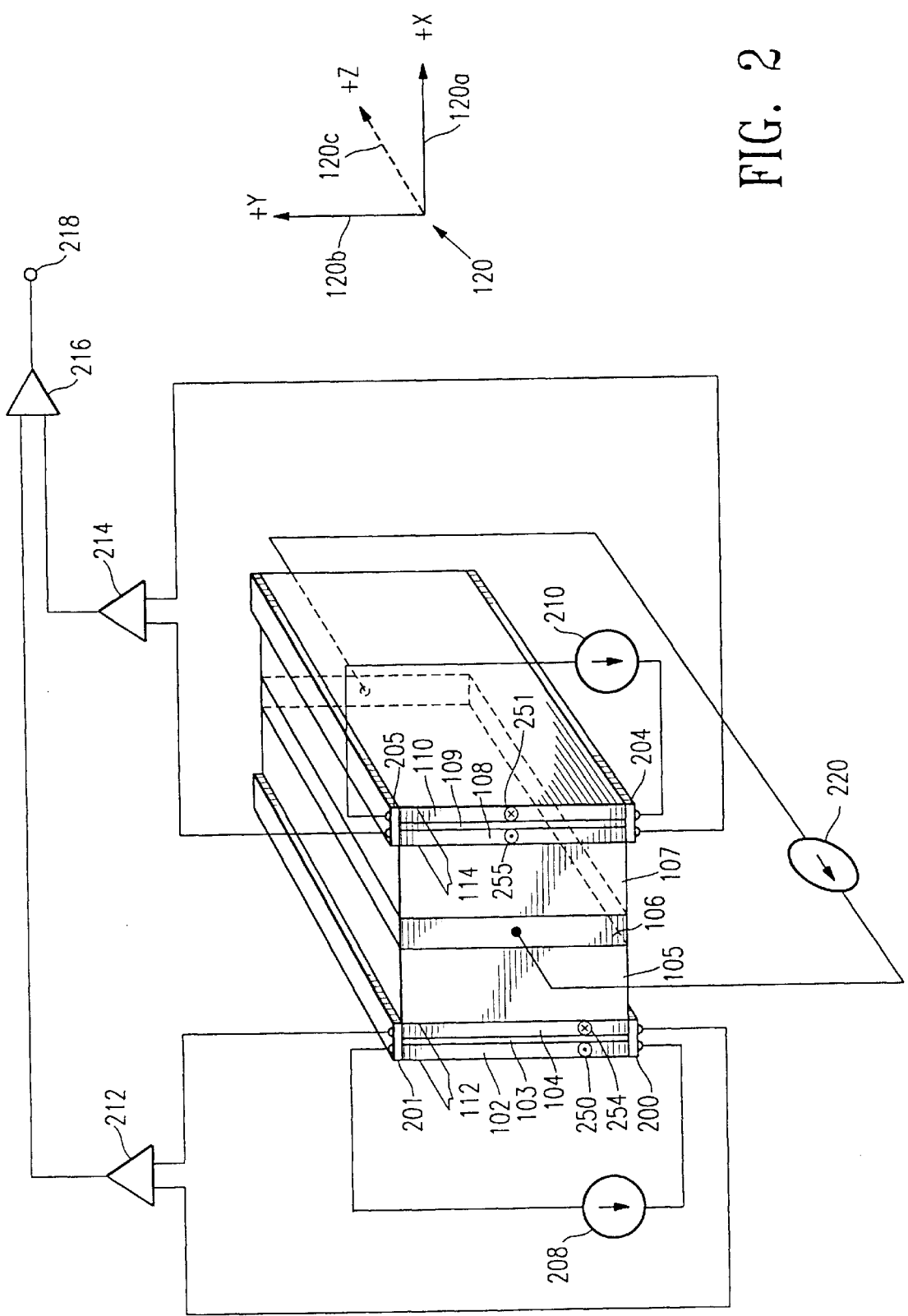
FIG. 2 is a cross-sectional perspective view of the dual spin valve read sensor of the invention, also depicting application of sense currents, application of bias current, and output measurement.

The sensor 100 is associated with a number of different accessories, which serve to bias the sensor 100 properly and measure the sensor's output. These features appear in FIG. 2, in relation to the sensor 100. These accessories are more easily understood with reference to a coordinate system 120 shown in FIGS. 1–2. The coordinate system 120 defines a +x axis 120a, a +y axis 120b, and a +z axis 120c. Opposite to these directions are −x, −y, and −z axes (not shown).

Each spin valve 112/114 is coupled to a lead for connection to various other electrical components. For example, the spin valve 112 is associated with leads 200–201, and the spin valve 114 is associated with the leads 204–205. Each of the leads 200–201 and 204–205 preferably comprises a conductive material such as about 500 Å underlayer of Cr. The attachment of leads to spin valves is a well known technique, as exemplified by the following reference, the entirety of which is hereby incorporated by reference: U.S. Pat. No. 5,557,491, to H. S. Gill et al.

Sense Current

Each spin valve 112/114 is coupled to a separate sense current source, which directs a sense current through the spin valve. In the illustrated embodiment, the spin valve 112 is coupled to a sense current source 208 via the leads 200–201. Similarly, the spin valve 114 is coupled to a sense current source 210 via the leads 204–205. As illustrated, sense current flows through each spin valve 112/114 in the direction of the +y axis 120b.

The sense current flowing through each spin valve 112/114 magnetizes that spin valve's ferromagnetic layers along the easy magnetic axes 130 and 132 of these layers as follows. In the illustrated example, the easy axes 130 and 132 of the ferromagnetic layers 102/104/108/110 are oriented along the axis defined by the +z and −z directions.

As previously mentioned, the sense current in the spin valve 112 is directed along the +y axis 120b. As a result, the layer 102 has a magnetic orientation in the direction 250, according to the well known right-hand-rule of electromagnetics. For ease of explanation, directional shorthand is used herein, where a circled dot indicates a direction coming out of the page (like an arrow's head), and a circled "x" indicates a direction going into the page (like an arrow's tail)). The magnetic field from the sense current in the spin valve 112 gives the layer 104 a magnetic orientation in the direction 254.

The sense current in the spin valve 114 is also directed along the +y axis 120b. Accordingly, the layer 108 has a magnetic orientation in the direction 255, according to the right-hand-rule. The magnetic field from the sense current in the spin valve 114 gives the layer 110 a magnetic orientation in the direction 251.

The magnetic field from the sense current flowing in the spin valve 112 also affects the layers 108/110 of the other spin valve 114. Similarly, the magnetic field from the sense current flowing in the spin valve 114 also affects the layers 102/104 of the other spin valve 112. In particular, the field from the spin valve 114 reinforces the magnetization of the layer 102 of the neighboring spin valve 112 along the −z axis. Likewise, the field from the spin valve 112 reinforces the magnetization of the layer 110 of the neighboring spin valve 114 along the +z axis. The layers 102/110 may therefore be considered "pinned" layers, although they are "pinned" by a different mechanism than the usual exchange coupling with an antiferromagnetic layer.

Hence, these outer layers 102/110 are called current-induced ferromagnetic pinned layers. In contrast to the outer layers 102/110, the field from each neighboring spin valve reduces the net field acting on the inner layers 104/108. The inner layers 104/108 may therefore be considered "free" layers. Thus, the layer 104 is biased, albeit weakly, in the direction 254. And, the layer 108 is weakly biased in the direction 255.

Thus, the outer layers 102/110 are more "pinned" by the magnetic field from the sense currents. In contrast, the inner layers 104/108 are less "pinned" by the magnetic fields which oppose each other in this area. Thus, the inner layers 104/108 are left relatively free to change their magnetic orientation in response to the presence of external magnetic fields, such as those from a magnetic data storage medium. Thus, the inner layers 104/108 act more like free layers, whereas the outer layers 102/110 act more like pinned layers.

Bias Current

The bias conductor 106 is also coupled to a bias current source 220, preferably through leads (not shown) attached to the bias conductor 106. In the illustrated embodiment, the bias current source 220 provides a constant current through the bias conductor 106 in a generally perpendicular to the direction of sense current flow. In the illustrated example, the bias current flows in the direction of the +z axis 120c. As described in greater detail below, the bias current provides an additional pinning field to establish a desired magnetization direction in the current-induced ferromagnetic pinned layers 102/104/108/110.

Output Measurement

Each spin valve 112/114 is also coupled to a device to measure the output of the spin valve. In the illustrated example, these devices comprise voltage sensors, which detect the voltage drop across a respective spin valve. This voltage is proportional to the magnetic signal detected by the spin valve. In particular, each spin valve's resistance is held constant by its respective sense current source, and the spin valve's resistance changes in response to detected magnetic flux. As a more particular example, the spin valve 112 is coupled to a voltage sensor 212, and the spin valve 114 is coupled to a voltage sensor 214. In one embodiment, the sensors 112/114 may comprise differential amplifiers as shown in the present illustration.

Outputs from both voltage sensors 212/214 combined by a differential amplifier 216. The differential amplifier 216 computes the difference between the voltage drops across the two spin valves 112/114 and outputs a representative signal on an output 218.

It is emphasized that ordinarily skilled artisans having the benefit of this disclosure will recognize that certain changes may be made to the biasing, magnetization, and other characteristics of the various sensor components without departing from the scope of the invention. More particular explanation is provided below, concerning the particular manner and effect of biasing the spin valves 112/114, biasing the conductor 106 and measuring voltage drops in the spin valves 112/114.

Magnetic Disk Storage System

As mentioned above, the sensor 100 is preferably implemented in a slider of a read/write head. In an exemplary implementation, the head may be part of a magnetic disk storage system, such as the exemplary magnetic disk storage system 300 shown in FIG. 3. Ordinarily skilled artisans will recognize, however, that invention is also applicable to other magnetic recording systems than the specific embodiment 300 illustrated in FIG. 3.

Figure 3:
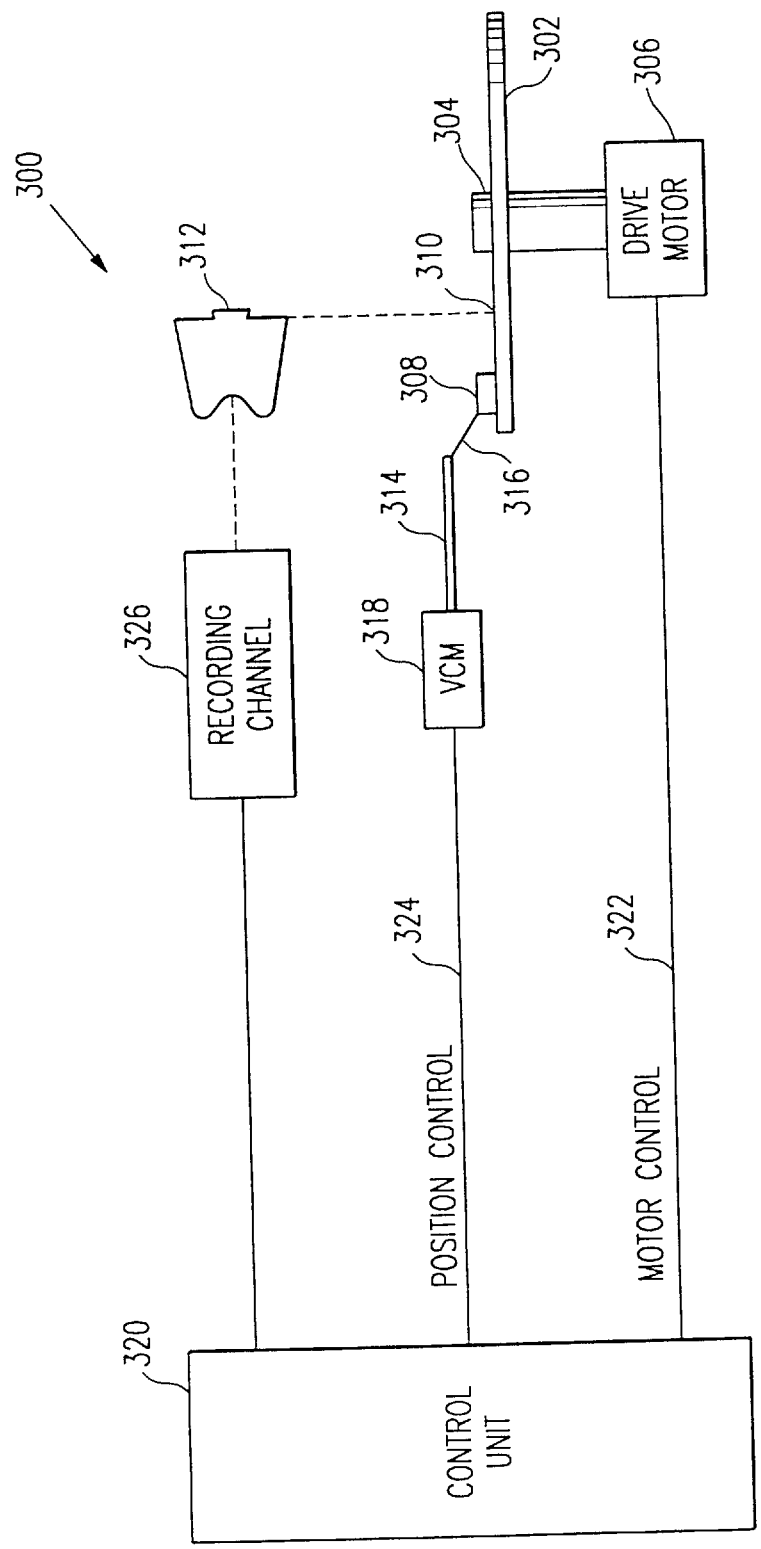
FIG. 3 is a block diagram of a magnetic disk storage system according to the invention.

The magnetic disk storage comprises at least one rotatable magnetic disk 302 is supported on a spindle 304 and rotated by a disk drive motor 306 with at least one slider 308 positioned on the disk 302, each slider 308 supporting one or more magnetic read/write heads. The magnetic recording media on each disk is in the form of an annular pattern of concentric data tracks (not shown) on the disk 302. As the disk 302 rotates, the sliders 308 are moved radially in and out over the disk surface 310 so that the heads 312 may access different portions of the disk where desired data is recorded. Each slider 308 is attached to an actuator arm 314 by means of a suspension 316. The suspension 316 provides a slight spring force which biases the slider 308 against the disk surface 310. Preferably, the actuator arm 314, suspension 316, and slider 308 are embodied in an integrated suspension assembly constructed in accordance with the invention, such as ones of the various embodiments described in detail above. Each actuator arm 314 is attached to an actuator means 318 The actuator 318 as shown in FIG. 3 may be a voice coil motor (VCM), for example. The VCM comprises a coil moveable within a fixed magnetic field, the direction and velocity of the coil movements being controlled by the motor current signals supplied by a controller. During operation of the disk storage system, the rotation of the disk 302 generates an air bearing between the slider 308 and the disk surface 310 which exerts an upward force or lift on the slider. The air bearing thus counterbalances the slight spring force of the suspension 316 and supports the slider 308 off and slightly above the disk surface by a small, substantially constant spacing during operation.

The various components of the disk storage system are controlled in operation by control signals generated by control unit 320, such as access control signals and internal clock signals. Typically, the control unit 320 comprises logic control circuits, storage means and a microprocessor, for example. The control unit 320 generates control signals to control various system operations such as drive motor control signals on line 322 and head position and seek control signals on line 324. The control signals on line 324 provide the desired current profiles to optimally move and position a selected slider 308 to the desired data track on the associated disk 302. Read and write signals are communicated to and from read/write heads 312 by means of recording channel 326.

The above description of a typical magnetic disk storage system, and the accompanying illustration of FIG. 3 are for representation purposes only. Ordinarily skilled artisans will recognize, for example, that disk storage systems may contain a large number of disks and actuators, and each actuator may support a number of sliders.

OPERATION

In addition to the various hardware embodiments described above, a different aspect of the invention concerns a method for operating a dual spin valve sensor.

Operational Sequence

Figure 4:
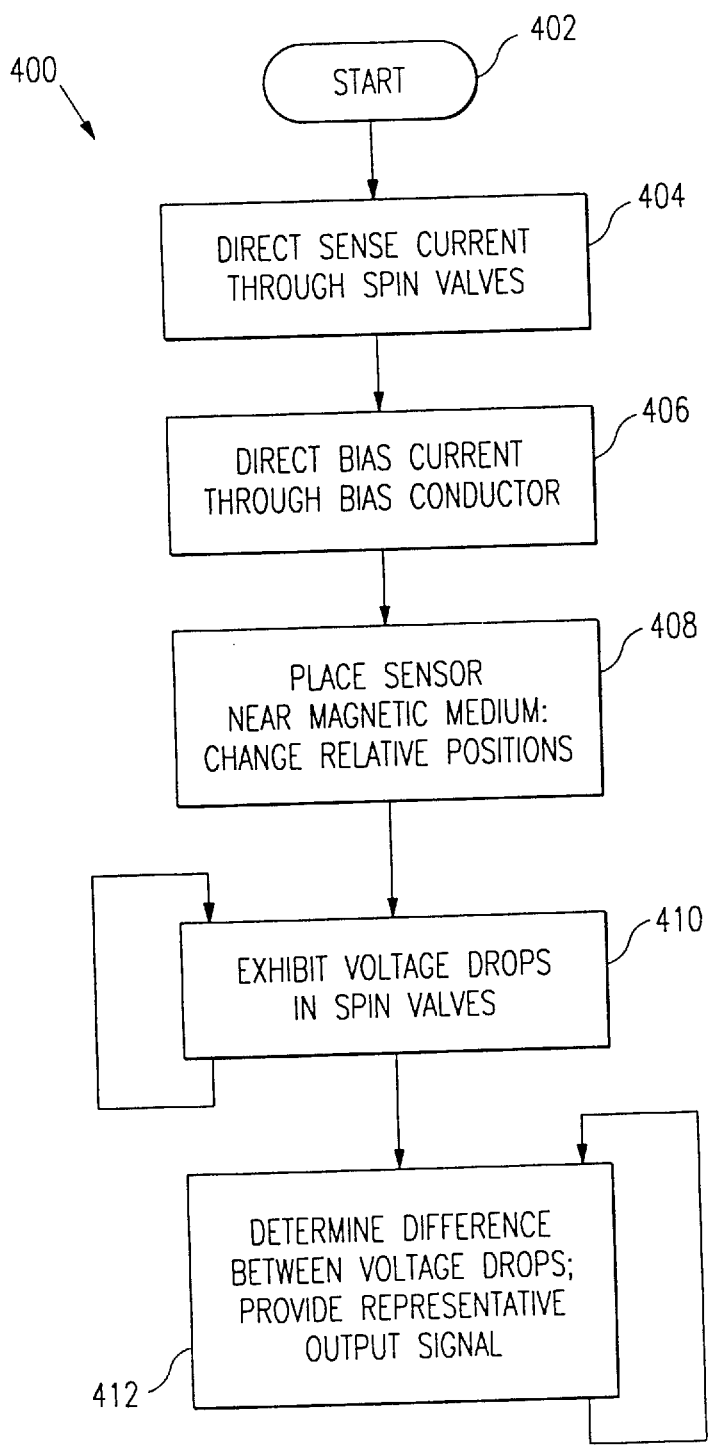
FIG. 4 is a flowchart illustrating a sequence of operational steps for operating a dual spin valve read sensor according to the invention.

FIG. 4 depicts a sequence of method steps 400 to illustrate one example of the method aspect of the present invention. For ease of explanation, but without any limitation intended thereby, the example of FIG. 4 is described in the context of the sensor 100 and the associated components described above in FIGS. 1–3.

After the steps 400 are initiated in task 402, the sense current sources 208/210 direct sense current through the respective spin valves 112/114 in task 404. As shown above, the sense current flows in both spin valves 112/114 in the direction of the +y axis 120b. In an illustrative embodiment, the each spin valve's sense current may be about 4–10 mA. The sense currents bias the various ferromagnetic layers as discussed above. In task 406, the bias current source 220 directs a bias current through the bias conductor 106. As mentioned previously, the bias current flows in the direction of the +z axis 120c, in the illustrated example. Preferably, the bias current is about 4–10 mA. The effect of the bias current is discussed in greater detail below.

In task 408, the sensor 100 is placed near an external magnetic field to be detected such as a magnetic recording medium containing stored magnetic flux signals. In the preferred embodiment, the recording medium comprises a magnetic data storage disk, magnetic tape, or another suitable magnetic data storage medium. Where the external magnetic field originates from a recording medium, task 408 further changes the relative position between the sensor 100 and the magnetic signals stored on the medium's surface. In this way, the sensor 100 scans the medium, sensing different stored flux signals as it traverses the medium. In the case of a magnetic data storage disk, the disk rapidly rotates while the read head (including sensor 100) floats above the disk with the sensor's air bearing surface supported by a thin cushion of air.

In response to the external magnetic field, the sensor 100 in task 410 exhibits corresponding voltage drops in the spin valves 112/114. The magnitude and amplitude of these resultant voltage drops are discussed in greater detail below. In the illustrated example, task 410 repeats continually as the read head traverses the magnetic medium.

In task 412, the differential amplifier 216 measures the difference between the voltage drops occurring in the spin valves 112/114, providing a representative output signal. Task 412 preferably repeats continually, the differential amplifier 216 constantly measuring the difference between the voltage drops in each spin valve 112/114.

Ordinarily skilled artisans may recognize various modifications to the exact implementation of the tasks 400, these changes being well within the scope of the invention. For instance, the order of the steps 404–408 may be changed relative to each other without affecting the operation of the sensor 100. However, operation of the steps 410–412 requires concurrent performance of the steps 404–408.

Spin Valve Behavior

No Bias Current

As mentioned above, the outer (pinned) layers 102/110 are biased in the directions 250 and 251 (respectively) by the sense currents flowing in the spin valves 112/114. The inner (free) layers 104/108 are more free to change their magnetizations in response to external magnetic fields. However, as mentioned above, the free layers 104/108 are weakly biased in the directions 254–255, respectively. The free layers 104/108 are therefore biased antiparallel to their neighboring respective pinned layers 102/110.

Figure 5:
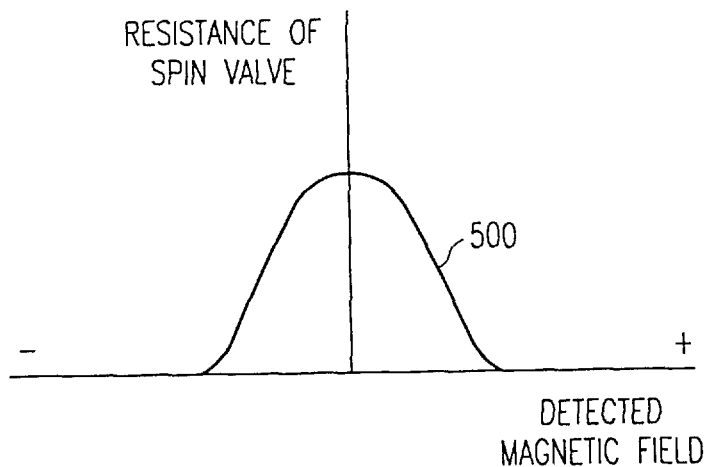
FIG. 5 is a transfer curve illustrating the relationship between detected magnetic flux and resistance in each spin valve sensors of the invention, without application of any bias current.

In the absence of any current in the bias conductor 106, each spin valve 112/114 responds in the same way to external magnetic fields. The transfer curve 500 (FIG. 5) depicts this response in greater detail. Namely, each spin valve's resistance is maximum in the absence of any detected magnetic field. Whenever a spin valve detects a magnetic field, with either positive or negative magnitude, the spin valve's resistance decreases.

With Bias Current

Figure 6:
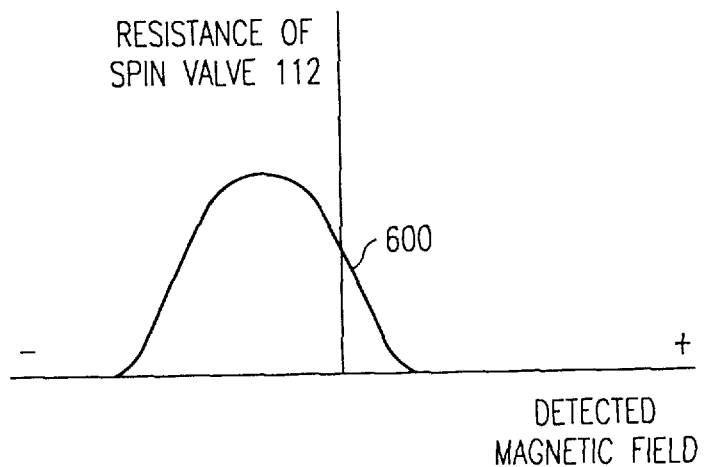
FIG. 6 is a transfer curve illustrating the relationship between detected magnetic flux and resistance in a first spin valve sensor of the invention during application of a predetermined bias current.
Figure 7:
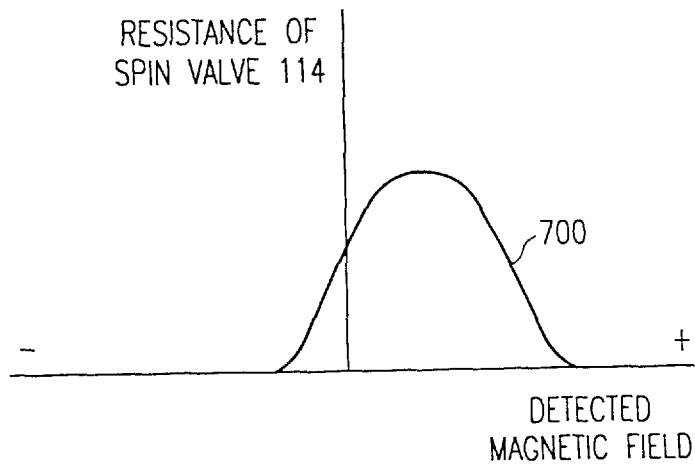
FIG. 7 is a transfer curve illustrating the relationship between detected magnetic flux and resistance in a second spin valve sensor of the invention during application of a predetermined bias current.

With current flowing through the bias conductor 106, each spin valve 112/114 responds differently to detected magnetic flux. Namely, the spin valve 112 responds according to the transfer curve 600 (FIG. 6), whereas the spin valve 114 responds according to the transfer curve 700 (FIG. 7).

In the case of the spin valve 112, its transfer curve 600 is shifted to the left with respect to the curve 500. Conversely, the transfer curve 700 of the spin valve 114 is shifted to the right with respect to the curve 500. This phenomena occurs because the magnetic field of the bias current affects the free layers 104/108 differently.

In particular, bias current flowing in the direction of the +z axis provides the ferromagnetic layers 102/104 of the spin valve 112 with an upward component, in the direction of the +y axis. This occurs as a result of the right-hand-rule, because both layers 102/104 are to the left of the bias conductor 106 as depicted in FIG. 1. Oppositely, the bias current provides the ferromagnetic layers 108/110 of the spin valve 114 with a downward component, in the direction of the −y axis. This also occurs as a result of the right-hand-rule, because the layers 108/110 are to the right of the bias conductor 106 as depicted in FIG. 1.

Under the influence of magnetic fields from both sense and bias currents, magnetization of each free layer 104/108 is no longer aligned antiparallel to its corresponding pinned layer 102/110, respectively. Consequently, the resistance of the spin valves 112/114 is not maximum in this state.

As shown by the transfer curve 600, the spin valve 112 responds to positive magnetic flux signals by decreasing its resistance, since the external magnetic field further aligns the magnetization of the free layer with that of the pinned layer. In contrast, as shown by the transfer curve 700, the spin valve 114 responds to positive magnetic flux signals by increasing its resistance, since the flux further diverges the magnetization of the free layers. Therefore, the present system is preferably operated so that the magnitude of detected magnetic field signals operates the spin valves 112/114 on opposite sides of their respective transfer curves 600/700. If desired, the level of bias current may be regulated to ensure various desirable operating characteristics of the spin valves 112/114, such as operation of each spin valve 112/114 within a nearly linear range of its transfer curve, operation of the spin valves 112/114 to detect both positive and negative magnetic fields of a certain magnitude while remaining in linear operation, etc.

An important advantage of the foregoing arrangement is that voltage signals from the spin valves 112/114 may be combined by taking the difference of these signals. In any common mode noise is present, such as field noise or distortion from thermal asperity hits, this noise will be present in both spin valves' signals alike. However, when the spin valve output signals are combined by taking their difference, the common mode signals are subtracted out. The resultant signals is therefore free from common mode noise.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. An apparatus for reading data, comprising:
 a first substantially planar magnetoresistive spin valve;
 a second substantially planar magnetoresistive spin valve oriented in a substantially parallel plane to the first spin valve;
 a conductive bias layer interposed between the first and second spin valves;
 a first insulating layer contactingly interposed between the first spin valve and the conductive bias layer; and
 a second insulating layer contactingly interposed between the second spin valve and the conductive bias layer.

2. The apparatus of claim 1, further including output sensors to measure respective voltage drops occurring in the first and second spin valves.

3. The apparatus of claim 2, further including a differential amplifier coupled to the output sensors and providing an output signal proportional to a difference between the voltage drops of the first and second spin valves.

4. The apparatus of claim 1, further including:
 a first sense current source coupled to the first spin valve to direct a first sense current through the first spin valve in a first direction;
 a second sense current source coupled to the second spin valve to direct a second sense current through the second spin valve in the first direction; and a bias current source coupled to the conductor bias layer to direct a bias current through the conductive bias layer in a direction substantially perpendicular to the first direction.

5. The apparatus of claim 1, at least one of the spin valves comprising a conductive mid-layer contactingly interposed between opposing layers of ferromagnetic material.

6. The apparatus of claim 5, the ferromagnetic layers comprising NiFe.

7. The apparatus of claim 5, the conductive mid-layer comprising Cu.

8. The apparatus of claim 1, the insulating layers comprising $Al_2O_3$.

9. The apparatus of claim 1, the conductive bias layer comprising Ta.

10. An apparatus for reading data, comprising:
a first substantially planar magnetoresistive spin valve means;
a second substantially planar magnetoresistive spin valve means oriented in a substantially parallel plane to the first spin valve means;
conductive bias means interposed between the first and second spin valve means;
a first insulating means contactingly interposed between the first spin valve means and the conductive bias means; and
a second insulating means contactingly interposed between the second spin valve means and the conductive bias means.

11. The apparatus of claim 10, further including means for providing an output signal proportional to a difference between voltage drops occurring in the first and second spin valve means.

12. The apparatus of claim 10, further including:
a first sense current source means coupled to the first spin valve means for directing a first sense current through the first spin valve means in a first direction;
a second sense current source means coupled to the second spin valve means for directing a second sense current through the second spin valve means in the first direction; and
a bias current source means coupled to the conductive bias means to direct a bias current through the conductive bias means in a direction substantially perpendicular to the first direction.

13. The apparatus of claim 10, at least one of the spin valve means comprising a conductive means contactingly interposed between opposing ferromagnetic means.

14. The apparatus of claim 13, the ferromagnetic means comprising NiFe.

15. The apparatus of claim 13, the conductive means comprising Cu.

16. The apparatus of claim 10, the insulating means comprising $Al_2O_3$.

17. The apparatus of claim 10, the conductive bias means comprising Ta.

18. A magnetic storage system, comprising:
a magnetic storage medium having a plurality of tracks for recording data; and
a suspension assembly including:
a disk access arm mounted in a predetermined relationship to the magnetic storage medium, the arm having a distal end and a proximal end; and
a read head mounted to the distal end, said read head including a dual spin valve sensor that comprises:
a first substantially planar magnetoresistive spin valve;
a second substantially planar magnetoresistive spin valve oriented in a substantially parallel plane to the first spin valve;
a conductive bias layer interposed between the first and second spin valves;
a first insulating layer contactingly interposed between the first spin valve and the conductive bias layer; and
a second insulating layer contactingly interposed between the second spin valve and the conductive bias layer.

19. The magnetic storage system of claim 18, further including output sensors to measure respective voltage drops occurring in the first and second spin valves.

20. The magnetic storage system of claim 19, further including a differential amplifier coupled to the output sensors and providing an output signal proportional to a difference between the voltage drops of the first and second spin valves.

21. The magnetic storage system of claim 18, further including:
a first sense current source coupled to the first spin valve to direct a first sense current through the first spin valve in a first direction;
a second sense current source coupled to the second spin valve to direct a second sense current through the second spin valve in the first direction; and
a bias current source coupled to the conductor bias layer to direct a bias current through the conductive bias layer in a direction substantially perpendicular to the first direction.

22. The magnetic storage system of claim 18, at least one of the spin valves comprising a conductive mid-layer contactingly interposed between opposing layers of ferromagnetic material.

23. The magnetic storage system of claim 22, the ferromagnetic layers comprising NiFe.

24. The magnetic storage system of claim 22, the conductive mid-layer comprising Cu.

25. The magnetic storage system of claim 18, the insulating layers comprising $Al_2O_3$.

26. The magnetic storage system of claim 18, the conductive bias layer comprising Ta.

27. A differential detection spin valve sensor, comprising:
a first substantially planar spin valve, comprising:
a first ferromagnetic layer;
a second ferromagnetic layer;
a first conductive layer interposed between the first and second ferromagnetic layers; and
a second substantially planar spin valve oriented in a substantially parallel plane to the first spin valve and comprising:
a third ferromagnetic layer;
a fourth ferromagnetic layer;
a second conductive layer interposed between the third and fourth ferromagnetic layers;
a bias conductor interposed between the first and second spin valves;
a first insulating layer interposed between the first spin valve and the bias conductor; and a second insulating layer interposed between the second spin valve and the bias conductor.

28. The sensor of claim 27, wherein:

the first ferromagnetic layer is pinned with a magnetization direction in a first direction;

the second ferromagnetic layer has a magnetization, direction including a component in a second is substantially antiparallel to the first direction;

the third ferromagnetic layer has a magnetization, direction including a component in the first direction; and the fourth ferromagnetic layer is pinned with a magnetization direction in the second direction.

29. The sensor of claim 28, the bias conductor carrying an electrical current flowing substantially in the second direction.

30. The sensor of claim 28, the first and second conductive layers each carrying electrical currents flowing substantially perpendicular to the first direction.

* * * * *